United States Patent [19]
Chirravuri et al.

[11] Patent Number: 5,287,216
[45] Date of Patent: Feb. 15, 1994

[54] FIBER AMPLIFIER WITH MULTIPLE PUMPS

[75] Inventors: Jagannath Chirravuri, Medfield; Ta-Sheng Wei, Wayland; William J. Miniscalco, Sudbury, all of Mass.

[73] Assignee: GTE Laboratories Incorporated, Waltham, Mass.

[21] Appl. No.: 991,001

[22] Filed: Dec. 16, 1992

Related U.S. Application Data

[63] Continuation-in-part of Ser. No. 990,225, Dec. 14, 1992.

[51] Int. Cl.$^5$ .............................. H01S 3/30; H04J 1/00
[52] U.S. Cl. ..................................... 359/341; 359/345
[58] Field of Search ................................ 359/341, 345

[56] References Cited

U.S. PATENT DOCUMENTS 5,140,456  8/1992  Huber ................................... 359/341
5,185,826  2/1993  Delavaux ........................ 359/341 X
5,191,586  3/1993  Huber ............................. 359/341 X

OTHER PUBLICATIONS

Shiraishi, Kazuo, et al. "Beam Expanding Fiber Using Thermal Diffusion of the Dopant", Journal of Lightwave Technology, vol. 8., No. 8, Aug. 1990.

*Primary Examiner*—Mark Hellner
*Attorney, Agent, or Firm*—Lawrence F. Monks

[57] ABSTRACT

A fiber optic amplifier is disclosed utilizing a doped fiber to provide amplification through stimulated emission. The doped fiber is simultaneously pumped by multiple pump lasers generating optical waves of differing wavelengths. The optical waves from the lasers are combined using a wavelength division multiplexer before introduction into the doped fiber. The use of multiple pump lasers decreases the power requirements of each laser, reduces the cost of the amplifier, and increases reliability without compromising the gain of the amplifier.

4 Claims, 4 Drawing Sheets

FIBER AMPLIFIER WITH MULTIPLE PUMPS

RELATED APPLICATIONS

The present invention is a continuation-in-part of the application entitled "Optical Fiber Amplifier with Reduced Splice-Loss", U.S Ser. No. 07/990,225, which was filed on Dec. 14, 1992 naming at least one of the present inventors and assigned to the same assignee.

FIELD OF THE INVENTION

The instant invention relates generally to pumped fiber optic amplifiers and more particularly to pumped fiber optic amplifiers employing multiple pump lasers.

BACKGROUND OF THE INVENTION

Activity in the optimization of performance for the erbium doped fiber amplifiers (EDFA) has been motivated by their potential applications in communication networks. In network topologies with large fanouts as for example star topologies, the erbium doped fiber amplifier is utilized to overcome splitting losses. As an in-line amplifier, these devices have application in long distance communications where erbium doped fiber amplifiers are expected to increase considerably the repeater spacing. A typical configuration for the erbium doped fiber amplifier consists of a pump laser operating at a wavelength of 1480 nm or 980 nm which is combined with the signal of wavelength 1550 nm into the erbium doped fiber using either a dichroic beam splitter or a fiber wavelength division multiplexer (WDM). The amplified signal at 1550 nm and a portion of the pump radiation appear at the output where they are separated using again either a dichroic beam splitter or fiber WDM.

To maximize the pump intensity in the erbium doped fiber amplifier, bi-directional pumping is commonly utilized. This involves pumping with two lasers, one from each end of the amplifier. For optimal performance a high numerical aperture (N.A.) fiber reduces the mode field diameter of the pump and signal thereby increasing its intensity and therefore gain.

The most expensive component in the erbium doped fiber amplifier is the pump laser primarily due to the high power requirement. Of the two most common types of pump lasers, 1480 and 980 nm, the later is more efficient and also results in lower noise in the amplifier, making it the wavelength of choice from the perspective of performance. However, the technology of fabricating these 980 nm InGaAs strained layer lasers is relatively new and is still developing. An important issue is the reliability of these pump lasers. These lasers have a typical lasing threshold of 30 mA and a differential quantum efficiency of 0.6–0.8 mW/mA. It is also becoming clear that the lifetime of these lasers is significantly degraded when operated at currents above 150 mA. This places an upper limit of approximately 95 mW on laser power which is further reduced by factors such as laser-fiber (pigtail) coupling and losses associated with the 980/1550 WDM couplers. Taking these losses into account, about 40 mW of pump power can be coupled into the erbium doped fiber. Power amplifiers with an output signal power of approximately 15 dBm require approximately 100 mW of 980 nm pump power in the active fiber. Given the constraints described above, it is not practical to achieve this level of pump power even using bi-directional pumping using two pump lasers. Taking these factors into account it becomes desirous to increase the pump power without compromising the reliability of pump lasers in the erbium doped fiber amplifier.

OBJECTS OF THE INVENTION

It is an object of the invention to obviate the above disadvantages of the prior art.

It is a further object of the instant invention to provide for a fiber optic amplifier that requires lower pump power for each of the pump lasers, thereby improving reliability.

It is a yet further object of the instant invention to provide for a fiber optic amplifier with increased signal output power without compromising the reliability of pump lasers for a fiber amplifier.

SUMMARY OF THE INVENTION

These and other objects and advantages are achieved in one aspect of the instant invention, wherein a fiber optic amplifier is described having multiple pump sources for cooperative pumping of a fiber. Fiber optic amplifiers are utilized for increasing the gain of an input signal at a specified wavelength. The input signal to be amplified is launched into an optical fiber which is usually doped with an element from the rare earth family of elements. A second optical wave at a second specified wavelength is introduced into the doped fiber and combined with the first to produce stimulated emission of photons at the first wavelength and thus amplification of the input signal. The source of the pump radiation is a pump laser. The pump and signal waves are combined using either a dichroic beam splitter, polarization beam splitter, or a fiber wavelength division multiplexer that is spliced to the doped fiber amplifier section. Until recently it was generally believed that for pumping an erbium doped fiber amplifier using 980 nm lasers the wavelength of these lasers had to be tightly controlled at 980 nm. However, for power and in-line amplifiers where noise introduced by the amplifier is not of paramount importance, the pump wavelength has a relaxed tolerance of approximately plus or minus 15 nm. This relaxation of the wavelength tolerance increases the yield of the pump laser manufacturing process and thereby lowering their cost. Moreover, two pump lasers with different wavelengths can be simultaneously used to pump the erbium doped fiber amplifier. The two or more pump lasers can be wavelength multiplexed using simple WDM (wavelength division multiplexing) techniques, thus translating into a significant increase in available pump power which allows for the operation of the pump lasers at lower currents, increasing reliability.

DETAILED DESCRIPTION OF THE INVENTION

Figure 1:
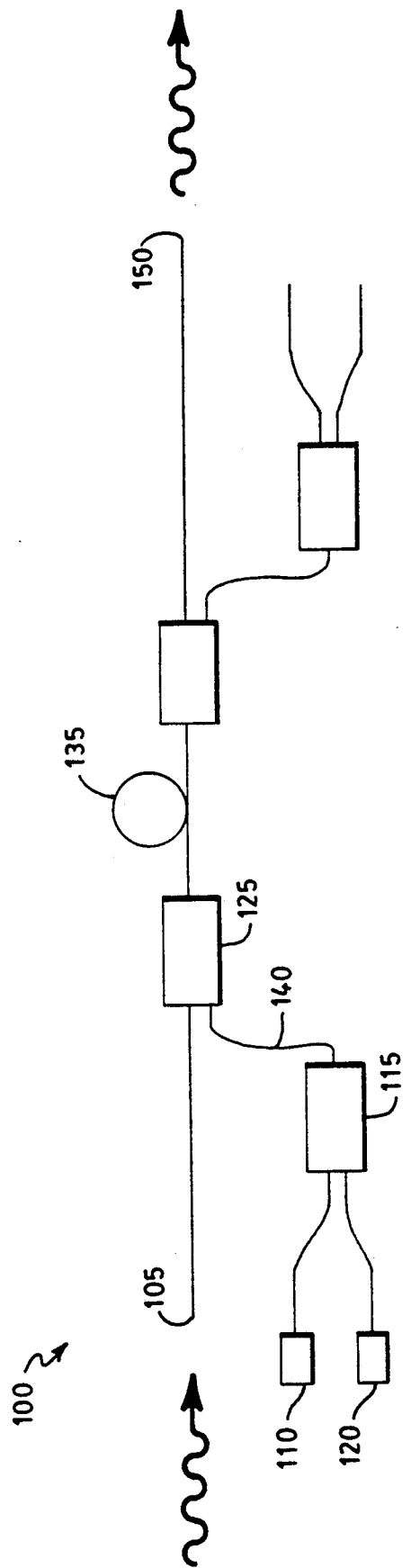
FIG. 1 is a schematic of an fiber amplifier in accordance with one embodiment of the invention.

FIG. 1 depicts an illustration of a doped fiber amplifier 100 in accordance with the present invention. In the preferred embodiment of the instant invention, the fiber is doped with erbium. However, one of ordinary skill in the art will recognize that the fiber may be doped with other elements without departing from the spirit of the invention. An input signal is presented at 105. Pump radiation from a first pump laser module 110 and a second pump laser module 120 are combined using a fiber wavelength division multiplexer 115. The combined output of first waveguide division multiplexer 115 is further combined with the input signal at 105 in a second wavelength division multiplexer 125 producing a combined output into a doped fiber 135. First pump laser module 110 and the second pump laser module 120 are pigtailed laser diodes which generate light radiation at wavelengths $\lambda_1$ and $\lambda_2$ respectively within a tolerance of plus or minus 15 to 20 nm of a specified wavelength, $\lambda_c$. For an erbium amplifier, wavelengths in the 960-1000 nm wavelength window are presented to wavelength division multiplexer 115, and combined. While two pump lasers are depicted in FIG. 1, this is for exemplary purposes only, and a multiplicity of pump lasers may be combined at wavelength division multiplexer 115 without departing from the scope of the invention so long as the lasers radiate light within the required wavelength tolerance, approximately plus or minus 20nm for an erbium doped fiber amplifier pumped at 980 nm, for generating stimulated emission in the doped fiber 135.

While this invention provides the greatest benefit for pump lasers that emit a single longitudinal mode because this permits more efficient and higher density wavelength multiplexing, it also applies to multi-longitudinal mode pump lasers.

The doped fiber 135 has a high numerical aperture (N.A.) with a typical mode field diameter of less than 4 $\mu$m. The mode field diameter of the fiber used in a typical wavelength division multiplexer is typically larger. With a mode field diameter of 8 $\mu$m for the latter the splice loss is $\simeq$2 dB between wavelength division multiplexer 125 and fiber 135. This translates to a loss of 40% of the pump power.

This loss can be significantly reduced by fabricating the output fibers of laser modules 110 and 120 with the same mode field diameter (MFD) as the input fibers of wavelength division multiplexer 115 same as the output fiber of wavelength division multiplexer 115, the input fiber of wavelength division multiplexer 125, and the output fiber of wavelength division multiplexer 125 with same MFD as the doped fiber 135. The splice losses between the pump laser modules, the wavelength division multiplexers, and the doped fiber are thereby greatly reduced.

Use of a fiber with a small mode field diameter in laser modules 110 and 120 enhances the coupling efficiency between the laser and fiber since diode lasers typically have small mode field diameters of a few microns depending on the laser geometry. Using the approach described above, the only splice loss of any significance is at the input 105 and output 150 where the small mode field diameter fiber is typically spliced to a 1550 nm transmission fiber with a larger mode field diameter which is typically 9 $\mu$m. This loss can be minimized using beam expansion of the smaller beam before splicing. One approach to achieve this is the use of thermal diffusion of the dopant for example Ge to expand the beam as described by K. Shiraishi et al. in the *Journal of Lightwave Technologyy*, vol. 8 at page 1151.

In a further embodiment, the wavelength division multiplexer is fabricated with an MFD to match the transmission fiber and an output fiber with MFD matched to the doped fiber 135.

EXPERIMENTAL RESULTS

Figure 2:
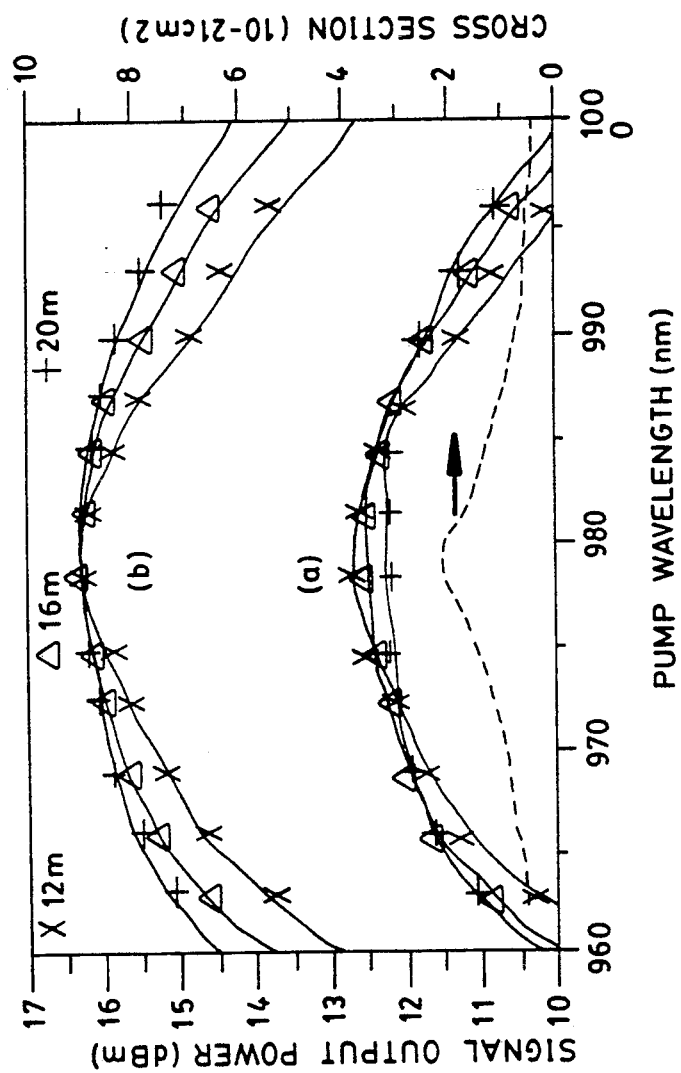
FIG. 2 displays the signal output power as a function of pump wavelength in accordance with the instant invention.

The insensitivity of erbium doped fiber amplifiers to pump wavelength is illustrated in FIG. 2, which displays the signal output power as a function of pump wavelength. A Ge/Al/P/Er- doped silica fiber with an N.A. of 0.18 and a cut-off wavelength of 940 nm was used. The signal launched into the erbium-doped fiber was $-1.4$ dBm. The experimental results are indicated by marks for three different fiber lengths each pumped with 40 and 80 mW. The solid curves are computer simulations of the experiment obtained using a numerical model. All basic parameters used by the model were determined experimentally and the calculated values are seen to be in good agreement with experiment. Also indicated in FIG. 2 is the ground-state absorption (GSA) cross section spectrum which peaks at 979 nm.

As expected, signal output increases with pump power, reaching 16.3 dBm, for the 16 m fiber pumped with 80 mW at 979 nm. This compares to 12.7 dBm and 0.71 for a 12 m fiber pumped with 40 mW. FIG. 2 reveals that the magnitude of the gain penalty for pump wavelengths away from 979 nm is significantly reduced at high pump powers. At 80 mW the penalty is $<0.5$ dB for a pump wavelength range of $\pm 9$ nm about the peak if one does not alter the fiber length from the optimum for 979 nm (16 m). The corresponding range for 40 mW is only $\pm 5$ nm. Detuning the pump wavelength decreases the absorption coefficient. FIG. 2 indicates that increasing the fiber length partially compensates for this and reduces the gain penalty. Note also that the output when pumped at 979 nm is less sensitive to fiber length for higher pump powers; for 80 mW with this fiber design the gain penalty is $<0.1$ dB with an uncertainty of $\pm 25\%$ around the optimum fiber length.

Figure 3:
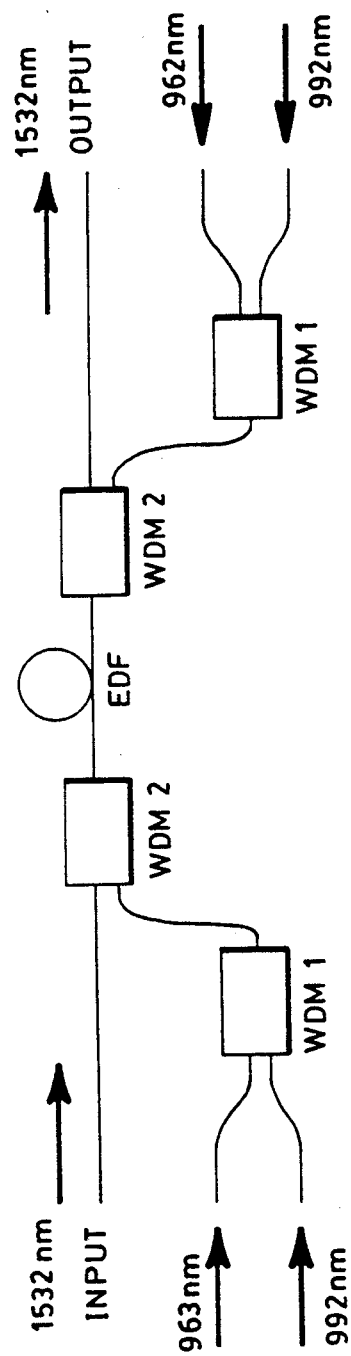
FIG. 3 is a schematic of the apparatus utilized to provide the experimental results herein.
Figure 4:
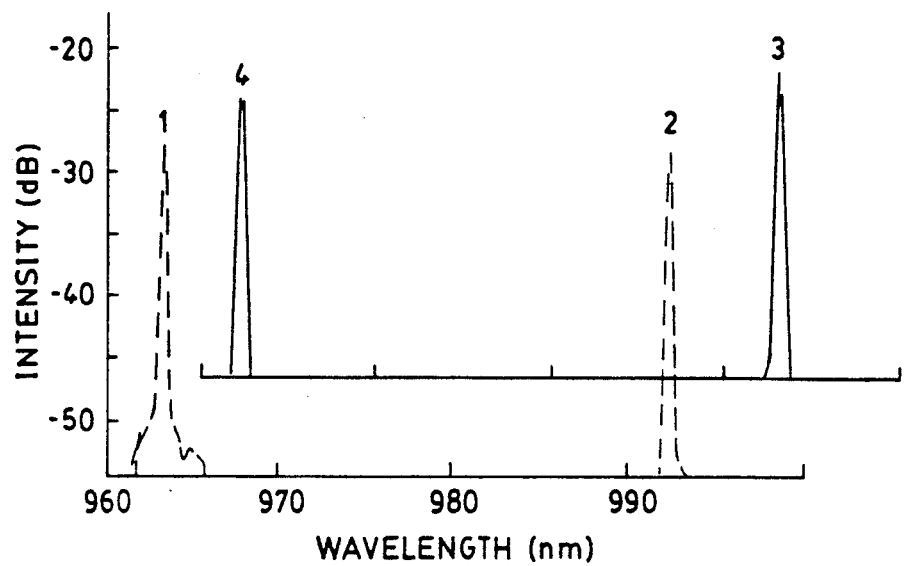
FIG. 4 shows the spectrum of the pump lasers at the input of the 20 m erbium doped fiber which has a numerical aperture of 0.18 and cutoff wavelength of 1300 nm.
Figure 5:
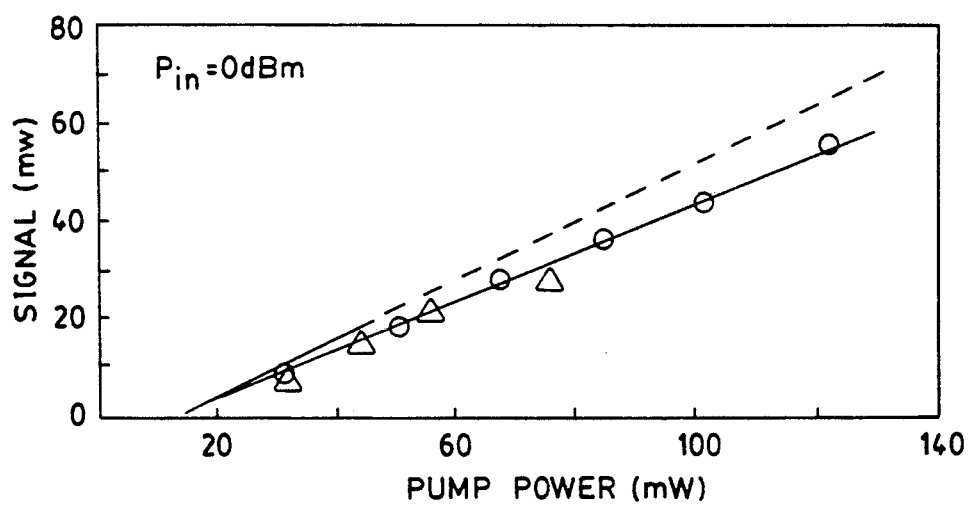
FIG. 5 depicts the signal output power of the erbium doped fiber amplifier as a function of the pump input.

Based on these results, it is seen that using pump lasers at wavelength intervals convenient for wavelength multiplexing (10–20 nm) does not introduce a significant gain penalty. FIG. 3 shows a schematic of the apparatus for the experiment. Two pump lasers with operating wavelengths of 963 nm and 992 nm, respectively, are combined using a wavelength division multiplexer, WDM 1. The WDM used is commercially available and makes use of dichroic filters to combine closely spaced wavelengths. WDM 1 combines the output of the two pump lasers, one with its wavelength in the 960-975 nm range and the other having its wavelength between 985 and 1000 nm, into an output fiber with an insertion loss of 0.5 dB. The output of WDM 1 is combined with the input 1532 nm optical signal using a broadband wavelength multiplexer, WDM 2. A similar arrangement of WDM's is placed at the other end of the erbium doped fiber amplifier. The total insertion loss for the pump lasers through both WDM's is 0.8 dB. FIG. 4 shows the spectrum of the pump lasers at the input of the 20 m erbium doped fiber which has a numerical aperture of 0.18 and cutoff wavelength of 1300 nm. Erbium doped fiber amplifier output is shown in FIG. 5 as a function of the pump input. The circles and triangles represent the experimental results and the corresponding calculations are shown by the solid line. The dashed line indicates the calculated signal power for pumping exactly at 979 nm. As expected there is a 0.9 dB penalty due to the ±5 nm deviation of the pump wavelengths from 979 nm. The WDM couplers used can combine any pump between 960 and 975 nm with another in the 985 and 1000 nm range. Thus by selecting pump lasers at 10 (20) nm apart, a lower gain penalty of ≃0.2(0.5) dB can be achieved.

While there has been shown and described what is at present considered the preferred embodiment of the invention it will be obvious to those skilled in the art that various changes and modifications may be made therein without departing from the invention as defined by the appended claims.

What is claimed is:

1. A fiber optic amplifier of an optical input signal comprising:

doped fiber means for amplifying said input signal at a first wavelength;

a first pump source means for generating a first optical wave at a first pump wavelength and coupled to said doped fiber means;

a second pump source means for generating a second optical wave at a second pump wavelength and coupled to said doped fiber means;

wherein the first and second pump wavelengths are approximately equal, differing by no more than 5% of the mean of the first and second pump wavelengths and the first and second pump wavelengths are wavelength multiplexed to produce a multiplexed pumping wave prior to combining the first optical wave with the multiplexed pumping wave in the doped fiber means.

2. The fiber optic amplifier of claim 1 wherein the doped fiber means is doped with an element of the rare earth family of elements.

3. The fiber optic amplifier of claim 1 wherein the pump source means includes a wavelength division multiplexer.

4. The fiber optic amplifier of claim 1 wherein the pump source means includes a dichroic beam splitter.

* * * * *